Dec. 22, 1970   J. L. WENZEL   3,550,080
LOW LEVEL LIQUID INDICATOR
Original Filed July 7, 1966   2 Sheets-Sheet 2

INVENTOR
JOHN L. WENZEL
BY John R. Faulkner
Keith L. Zerschling
ATTORNEYS

United States Patent Office

3,550,080
Patented Dec. 22, 1970

3,550,080
LOW LEVEL LIQUID INDICATOR
John L. Wenzel, Livonia, Mich., assignor to Ford Motor Company, Dearborn, Mich., a corporation of Delaware
Continuation of application Ser. No. 563,457, July 7, 1966. This application June 4, 1969, Ser. No. 833,887
Int. Cl. B60q 1/00; G01f 23/24
U.S. Cl. 340—59      7 Claims

ABSTRACT OF THE DISCLOSURE

This disclosure relates to a low level liquid indicator that may be used to indicate a low liquid level in a container, for example, a radiator used in an automotive vehicle. It employs a solid state switching component, for example, a controlled rectifier, connected in circuit with a source of direct current electrical energy and a warning means for giving a warning when the level of liquid in the container falls below a satisfactory operating level. Included in the circuit is open circuiting means which will open circuit the output electrodes of the controlled rectifier from the source of direct current electrical energy periodically. The warning means preferably takes the form of a flashing lamp that operates the open circuiting means which is preferably in the form of a heat responsive switch.

---

This application is a continuation of application No. 563,457, filed July 7, 1966, now abandoned.

This invention relates to a low level liquid indicator and more particularly to a low level liquid indicator that may be readily used to indicate a low liquid level in a container, for example, a radiator, used in an automotive vehicle.

The present invention makes use of a solid state switching component, a controlled rectifier, connected in circuit with a source of direct current electrical energy and a warning means for giving a warning when the level of liquid in a container, for example, a radiator, falls below a satisfactory operating level. Included in the circuit is an open circuiting means which will open circuit the output electrodes of the controlled rectifier from the source of direct current electrical energy periodically so that if liquid is restored to its proper operating level, the controlled rectifier will be turned off and will not be switched again to its conducting state when the open circuiting means energizes it. The warning means preferably takes the form of a flashing lamp that operates an open circuiting means, preferably in the form of a heat responsive switch.

In the preferred embodiment of the invention, the probe of the low level indicator is electrically insulated from the container and will extend into the liquid when it is at a satisfactory operating level. The probe, liquid and container form a part of a voltage divider that is coupled to a source of alternating current electrical energy. This alternating current preferably comes from the output windings of the alternator driven by the internal combustion engine of an automotive vehicle. The voltage divider includes a resistor connected in series with the probe, the liquid and the container. The junction of this resistor and the probe is connected to the gate electrode of the controlled rectifier. D.C. isolation is also provided for the probe so that only alternating current electrical energy is present between the probe and the container thereby preventing any electroplating action that may otherwise take place.

When the liquid in the container is at a proper operating level, the probe extends into the liquid thereby providing a low impedance path for the alternating current. The junction between the resistor and the probe, therefore, is at a potential sufficiently low that it will not fire the controlled rectifier. When the liquid level falls below the probe, the impedance will increase to a point where the junction potential will be raised sufficiently to fire the controlled rectifier. The controlled rectifier will be energized through the flashing warning lamp, and the lamp includes means for switching the lamp to its unenergized state and for disconnecting the output electrodes of the controlled rectifier from the source of direct current electrical energy a given period of time after the lamp is energized. This de-energizes or switches the controlled rectifier to its nonconducting state. The lamp will then, after a period of time, re-establish the circuit from the source of direct current electrical energy through the lamp to the output electrodes of the controlled rectifier. If the liquid in the container is still below the probe, the controlled rectifier will again conduct and the flashing lamp will again be energized. This action will occur periodically, with the lamp flashing a warning to the vehicle operator, until the liquid in the container is replenished to the extent that the liquid covers the probe.

A prove-out means is also provided to insure that the circuit is operating properly. This is done during starting operations of the internal combustion engine mounted in the automotive vehicle. When the starter motor is energized, a circuit is completed from the battery to the gate electrode thereby applying sufficient potential on the gate electrode to cause the controlled rectifier to conduct. This conduction of the controlled rectifier will light the flashing warning lamp indicating that it is operating properly. When starting operations are completed, the circuit will be broken between the source of direct current energy and the gate electrode. When the flashing lamp interrupts the circuit connecting the source of direct current electrical energy and the output electrodes of the controlled rectifier, it will return to its nonconducting state and will remain in this state when the flashing lamp again energizes the output electrodes from the source of direct current electrical energy.

An object of the present invention is the provision of a low level liquid indicator that is particularly designed to indicate a low liquid level into a container used in an automotive vehicle and that utilizes existing electrical components present in the vehicle thereby minimizing complexity and cost.

A further object of the invention is the provision of a low level liquid indicator in which a probe means is operated by alternating current electrical energy to minimize plating between the probe means and the container for the liquid.

Another object of the invention is the provision of a low level liquid indicator that utilizes a controlled rectifier designed to be operated directly from the battery of the automotive vehicle in which it is installed. Means are provided to not only give an intermittent warning indication to the vehicle operator of a low liquid level, but also to break the circuit to the controlled rectifier to cause it to switch to its nonconducting state.

Still another object of the invention is the provision of a low level liquid indicator for use in an automotive vehicle that utilizes a controlled rectifier and a warning indicator energized by it in which the controlled rectifier and warning lamp are energized during starting operations of the internal combustion engine mounted in the vehicle to thereby provide a prove-out means for the warning circuit.

Other objects and attendant advantages of the present invention may be more readily realized as the specification is considered in connection with the attached drawings in which.

Figure 1:
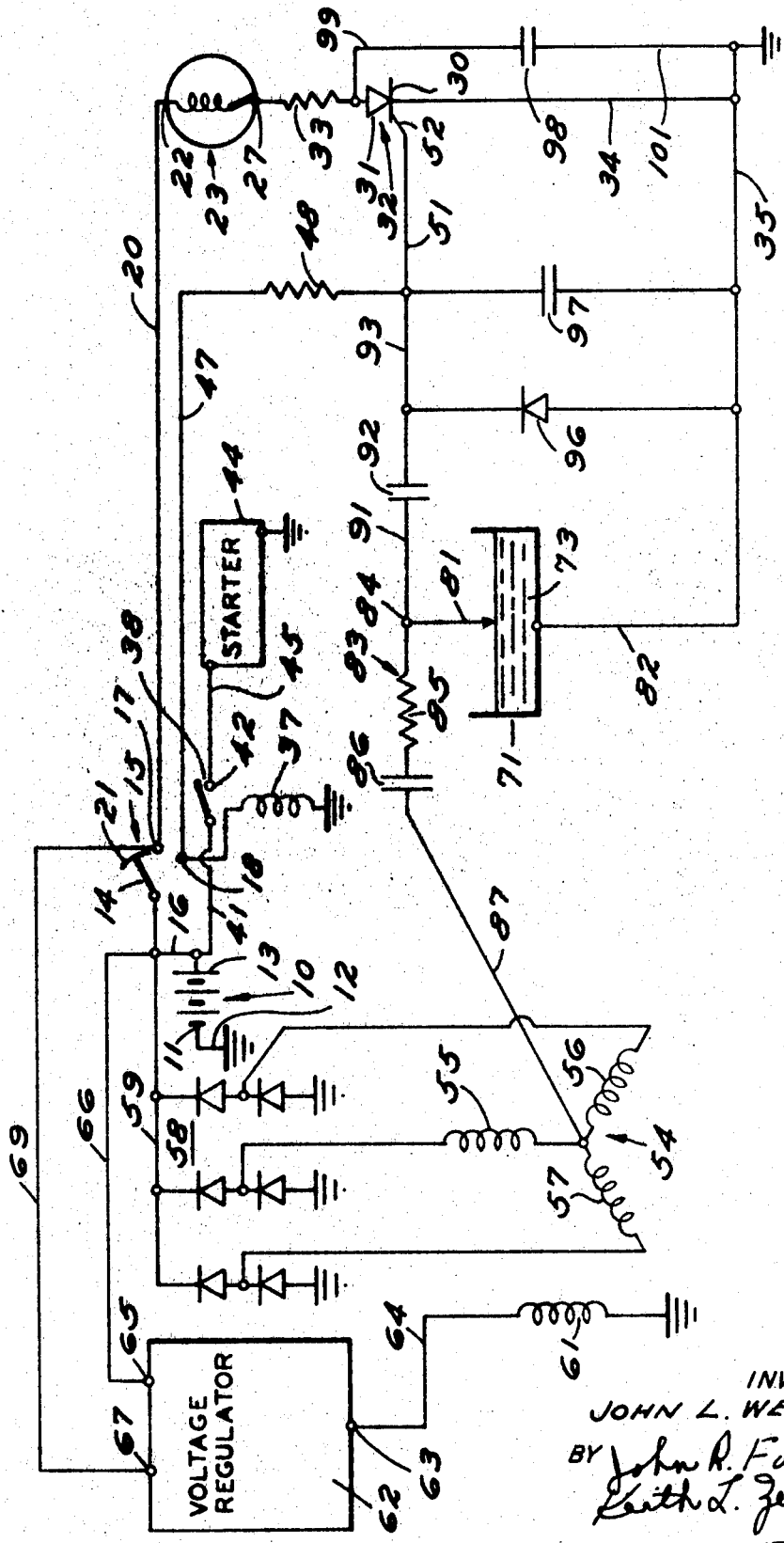
FIG. 1 is a circuit diagram of the present invention.

Referring now to the drawings in which like reference numerals designate like parts throughout the several views thereof, there is shown in FIG. 1 a circuit diagram of the present invention in which an electrical storage battery 10 has one terminal, for example, negative terminal 11, connected to ground through a lead 12. The other or positive terminal 13 is connected to a conductive movable arm 14 of ignition switch 15 through a lead 16. The ignition switch 15 has an "On" terminal 17 and a "Start" terminal 18. The movable arm 14 carries a conductive blade 21 which will contact both the "On" terminal 17 and the "Start" terminal 18 when the ignition switch is moved to the start position, but will contact only the "On" terminal 17 during other automotive vehicle operations.

Figure 2:
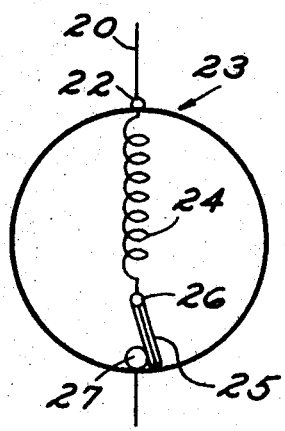
FIG. 2 is an enlarged view of the flashing lamp utilized as the warning means of the present invention.

The "On" terminal 17 of ignition switch 15 is connected to one terminal 22 of a warning lamp 23 of the flashing type by means of a lead 20. This warning lamp, as more specifically shown in FIG. 2, includes a filament 24 and a bimetal element or blade 25. The bimetal element or blade 25 is anchored at 26 and is normally in contact with terminal 27 when the lamp is unenergized. When the lamp 23 is energized, the heat from the filament 24 will heat the bimetal sufficiently after a given period of time to open the contact between the bimetal blade 25 and the terminal 27 thereby interrupting current through the winding 24. The interruption of current through the filament 24 will cause it to cool thereby permitting the bimetal blade 25 to cool and re-establish contact with the terminal 27.

The terminal 27 of the flashing warning lamp 23 is connected to the anode 31 of a controlled rectifier 32 through resistor 33. The cathode 30 of the controlled rectifier 32 is returned to ground and hence the negative terminal 11 of the electrical storage battery 10 through lead 34 and a ground line 35.

The "Start" terminal 18 of the ignition switch 15 is connected to a solenoid 37 of a starter relay, and the armature 38 of this relay is connected to the positive terminal 13 of the electrical storage battery 10 through a lead 41. A fixed contact 42 of the relay is connected to the starter 44 through a lead 45. The "Start" terminal 18 of the ignition switch 15 is connected also through lead 47, resistor 48 and lead 51 to the control or gate electrode 52 of the controlled rectifier 32.

As previously stated, the low level liquid indicator of the present invention is particularly designed for use in an automotive vehicle. The automotive vehicle may have a standard alternator 54 designed to charge the electrical storage battery 10 and to provide electrical energy for the various loads of the vehicle that are connected by various switching mechanisms (not shown) to the electrical storage battery. This alternator may comprise three output windings 55, 56 and 57 that are shown connected in a standard Y connection. These windings are connected to a standard full wave rectifier 58 that has a positive output bar 59 connected to the positive terminal of the storage battery, or source of electrical energy 10, and has another output bar, shown by the ground connections, connected to the negative terminal 11 of the source of electrical energy or storage battery 10 through these ground connections.

The alternator 54 also has a standard field winding positioned on a rotor (not shown) that is driven by the internal combustion engine of the vehicle in which the low level indicator of the present invention is mounted. A standard voltage regulator 62 is shown in block form and it includes an output terminal 63 connected to the field winding 61 through a lead 64 and an input terminal 65 connected to the positive terminal 13 of the source of electrical energy, or storage battery 10, and to the positive output bar 59 of the rectifier 58 through a lead 66. A field relay terminal 67 is connected to the "On" terminal 17 of the ignition switch 15 through a lead 69.

The alternator 54, the rectifier 58 and voltage regulator 62 operate in a conventional manner to provide direct current electrical energy to the source of electrical energy 10 and to the loads (not shown) connected to this source of electrical energy 10. To this end, when the ignition switch is closed, battery voltage is applied through the "On" terminal 17, lead 69 and terminal 67 to the field relay of the voltage regulator. This connects the battery 10, that is, its terminal 13, to the voltage regulator 62 by a lead 16, lead 66 and input terminal 65. The voltage regulator 62, therefore, limits the output voltage appearing across the rectifier 58 by limiting the energization of field winding 61 in accordance with well-known principles.

Figure 3:
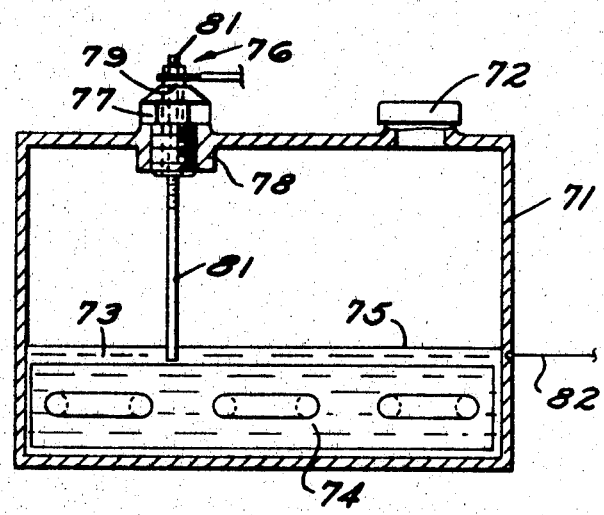
FIG. 3 is a view of the probe and liquid container employed with the present invention.

Referring now to FIG. 3, there is shown a container 71 having a closure cap 72 for replenishment of a liquid 73 carried by the container 71. The container 71 is represented here in schematic form and it may be a radiator of an automotive vehicle, in which case the structure designated by the numeral 74 is the radiator core. The liquid in the container should have a liquid level 75 that covers this core.

A probe, generally designated by the numeral 76, includes an outer casing 77 in the form of a nut that is threaded into a socket 78 supported by the container 71. An electrical insulating bushing 79 electrically insulates the operative cylindrical portion 81 of the probe from the nut 77. This operating portion 81 of the probe may be constructed of a suitable metal, for example, steel or brass, and it extends into the liquid 73 when the liquid is at a satisfactory operating level, as indicated by the numeral 75. The container 71, in the case of a radiator, is also constructed of an electrically conductive material, for example, brass, copper or steel, and it has a lead 82 electrically connected to it.

Referring back to FIG. 1, it can be seen that the container 71 together with the central cylindrical portion 81 of the probe 76 and the liquid 73 comprise a portion of a voltage divider 83, the junction of which is designated by the numeral 84. The other portion of the voltage divider is a fixed resistor 85. The fixed resistor 85 is coupled to the output windings 55, 56 and 57 of the alternator 54 through a coupling capacitor 86 and the lead 87. The lead may be coupled to the central junction of the Y as shown.

The junction 84 of the voltage divider 83 is also connected to the gate or control electrode 52 of the controlled rectifier 32 via lead 91, coupling capacitor 92, lead 93 and the lead 51.

The container 71 is connected to the grounded line 35 through the lead 82. A rectifying diode 96 is connected between the lead 93 and the grounded line 35, for purposes which will be described later.

A capacitor 97 is connected between the gate or control electrode 52 and the cathode 30 of the controlled rectifier 32 by lead 51 and via the grounded line 35 and lead 34. Another capacitor 98 is connected to the anode 31 of the controlled rectifier 32 via lead 99 and to the grounded line 35 and hence back to the cathode 30 of the controlled rectifier 32 via lead 101.

In the operation of the invention, the vehicle operator upon entering the vehicle will move the movable arm 14 of ignition switch 15 so that it is in contact with both the "On" terminal 17 and the "Start" terminal 18 of the ignition switch. This will provide electrical energy to the starter motor 44 by energizing solenoid 37 thereby bringing armature 38 into electrical contact with fixed contact 42. As a result, the positive terminal 13 of the electrical storage battery 10 will be connected to the starter 44. A positive voltage from the positive terminal 13 of the battery or D.C. source of electrical energy 10 will be applied to the gate electrode 52 of the controlled rectifier 32 sufficient to switch it to its conducting state via lead 16, movable arm 14, blade 21 and the "Start" terminal 18 of ignition switch 15, lead 47, resistor 48 and lead 51. A positive potential from the terminal 13 of the electrical storage battery 10 will also be applied to the anode 31 of the controlled rectifier via lead 16, movable arm 14, blade 21, "On" terminal 17, lead 20, filament 24 and bimetal blade 25 of the flashing lamp 23 and resistor 33. Such action will switch the controlled rectifier 32 to its conducting state thereby permitting electrical energy to flow through the filament 24, bimetal blade 25, and the anode 31 and cathode 30 of the controlled rectifier 32.

The action described above energizes the warning lamp 23 and provides a prove-out for this circuit to indicate to the operator of the automotive vehicle that it is working properly. After a given period of time the bimetal blade 25 will deflect so that it comes out of contact with the terminal 27 of the lamp 23, thereby removing the potential difference between the anode 31 and the cathode 30 of the controlled rectifier and extinguishing it. The bimetal blade 25, at this time commences to return toward the terminal 27, because there is no longer heat supplied to it from the filament 24. By this time the starting operation should have ceased and the internal combustion engine of the automobile should be in running condition. The operator of the vehicle, therefore, will move the ignition switch back to the "On" position only, so that the "Start" terminal 18 is de-energized. When the bimetal blade 25 re-establishes contact with the terminal 27 there will no longer be any potential applied to the gate or control electrode 52 from the "Start" terminal 18 and the controlled rectifier will remain in a nonconducting state.

When the internal combustion engine of the vehicle commences to operate, the alternator 54 will produce output voltages in the winding 55, 56 and 57 of an alternating sinusoidal type. The lead 87 that is connected to the center of the Y of the windings 55, 56 and 57 will have a halfway rectified type voltage impressed on it. This is due to the particular connection in which the lowermost rectifiers of the rectifier 58 that are connected to the output windings 55, 56 and 57 are also connected to ground. The capacitor 86, however, removes the D.C. component and leaves a modified alternating current waveform with a zero average D.C. component present at the resistor 86. Resistor 86 and the operative cylindrical portion 81 of the probe 76 together with the container 71 and the liquid 73 provide a voltage divider with a junction at 84 for this modified A.C. waveform.

It can be appreciated by an examination of the circuit that the voltage at 84 is a modified A.C. voltage waveform that has been reduced in amplitude by the ratio of the value of the resistor 85 and the impedance between the probe 81 and the container 71. This modified waveform passes through the capacitor 92 and is rectified by the rectifier 96, and this halfwave voltage then is applied to the gate electrode 52 of the controlled rectifier 32 through the lead 93 and the lead 51.

With the liquid 73 in engagement with the operative portion 81 of the probe, the impedance offered by these components may be on the order of 300 to 3,000 ohms, while the value of resistor 85 may be fixed at somewhere in the range between 68 and 100 thousand ohms. It can be appreciated, therefore, that the voltage present at the junction 84 and hence on the gate 52 of the controlled rectifier 32 is quite low, very nearly equal to ground potential. This voltage is insufficient to turn the controlled rectifier to its conducting state.

If, however, the liquid level 75 in the container 71 falls below the operative portion 81 of the probe 76, the impedance due to this gap approaches infinity and the full voltage present at the capacitor 86, which is rectified by the diode 96, is applied to the gate or control electrode 52 of the controlled rectifier 32 to switch it into its conducting state.

As previously explained, when the controlled rectifier 32 is switched to its conducting state current flows through the filament 24, the bimetal blade 25, and the terminal 27 of the flashing lamp 23 and then through the anode 31 and cathode 30 of the controlled rectifier 32. It is well-known that a controlled rectifier, once it is triggered into its conducting state by a voltage applied to its gate or control electrode equal to its threshold voltage, will remain in a conducting state until the voltage across the cathode and anode is reduced to zero.

The reduction of the voltage across the anode and cathode to zero is accomplished in the present invention when the bimetal blade 25 is deflected away from the terminal 27 of the lamp 23 due to the heat generated in the filament 24 after the lamp is energized for a predetermined time. When this happens, therefore, the controlled rectifier 32 is extinguished and the filament 24 of the lamp 23 is also extinguished. After a given period of time, however, the bimetal blade 25 will cool and will deflect back into engagement with the terminal 27 thereby again applying battery voltage to the anode 31 of the controlled rectifier 32. If the liquid level 75 of the liquid 73 contained in the container 71 is still below the probe 81, that is the liquid level supply has not been replenished, the voltage present at junction 84 and the gate or control electrode 52 will again be sufficient to trigger the controlled rectifier into conduction. The lamp 23, therefore, will again be energized and after a given period of time the bimetal blade 27 will again move out of contact with the terminal 27 thereby de-energizing the lamp and switching the controlled rectifier 32 to a nonconducting state.

The above-mentioned on-off action of the controlled rectifier and the flashing of the lamp 23 will continue until the operator of the vehicle replenishes the liquid supply 73 in the container 71 and raises the liquid to a satisfactory operating level where it covers the operating portion 81 of the probe 76. When this happens, of course, there will no longer be sufficient voltage at the point 84 to bring the controlled rectifier to its conducting state and, therefore, the flashing lamp will no longer flash and the controlled rectifier 32 will remain in its inoperative or nonconducting state.

The present invention also provides direct current isolation for the operative portion 81 of probe 76 through the coupling capacitor 86 and the capacitor 92. The capacitor 92 will prevent any direct current which might flow out of the gate electrode 52 and through the lines 51 and 93 from reaching the probe 81. This direct current isolation prevents any electroplating that might otherwise occur and that would seriously erode a probe that is operated under D.C. conditions.

The capacitors 97 and 98 are merely bypass capacitors that eliminate any misfiring of the controlled rectifier 32 that may otherwise occur due to line transients.

The present invention thus provides a reliable and long lived low liquid level indicator that is uncomplicated and inexpensive and that may be used to indicate a low liquid level in a liquid container, for example, a radiator, of an automotive vehicle.

What is claimed is:

1. A low level liquid indicator for an automotive vehicle comprising a source of direct current electrical energy, a controlled rectifier having an anode, a cathode and a gate electrode, a warning lamp connected in series with said source of direct current electrical energy and the cathode and anode of said controlled rectifier, a voltage divider comprising a fixed resistor, a container filled with liquid and a probe connected to said fixed resistor electrically insulated from said container, said probe being immersed in said liquid when said liquid is at a satisfactory operating level in said container and out of contact with the liquid when the liquid falls below the satisfactory operating level, means connecting the junction of said fixed resistor and said probe with said gate electrode of said controlled rectifier, and a source of alternating current electrical energy coupled to said voltage divider, means coupled to said source of alternating current electrical energy and said voltage divider for rendering the direct current component of said source substantially equal to zero, the resistance value of said fixed resistor and the impedance value of said probe, liquid and container being selected to provide insufficient voltage on the gate electrode of said controlled rectifier to cause conduction of the controlled rectifier when the liquid is at a satisfactory operating level and to provide sufficient voltage on said gate electrode when the liquid is below a satisfactory operating level, said warning lamp including means for periodically interrupting the series connection between said source of direct current electrical energy and the cathode and anode of said controlled rectifier.

2. The combination of claim 1 in which means are coupled to said probe and said gate electrode for isolating said probe from direct current electrical energy.

3. The combination of claim 2 in which said means coupled to said source of alternating current electrical energy and said voltage divider and to said probe and said gate electrode comprise a first and a second capacitor.

4. A low level liquid indicator for an automotive vehicle comprising a source of direct current electrical energy, a controlled rectifier having an anode, a cathode and a gate electrode, a warning lamp connected in series with said source of direct current electrical energy and the cathode and anode of said controlled rectifier, a voltage divider comprising a fixed resistor, a container filled with liquid and a probe connected to said fixed resistor electrically insulated from said container, said probe being immersed in said liquid when said liquid is at a satisfactory operating level in said container and out of contact with the liquid when the liquid falls below the satisfactory operating level, means including a capacitor connecting the junction of said fixed resistor and said probe with said gate electrode of said controlled rectifier, and a source of alternating current electrical energy, said source of alternating electrical energy comprising a vehicle driven alternator having three Y connected output windings with a center connection, said voltage divider being connected to said center connection, a capacitor connected in series with and between said center connection and said voltage divider, the resistance value of said fixed resistor and the impedance value of said probe, liquid and container being selected to provide insufficient voltage on the gate electrode of said controlled rectifier to cause conduction of the controlled rectifier when the liquid is at a satisfactory operating level and to provide sufficient voltage on said gate electrode to cause conduction of said controlled rectifier when the liquid is below a satisfactory operating level, said warning lamp including means for periodically interrupting the series connection between said source of direct current electrical energy and the cathode and anode of said controlled rectifier.

5. A low level liquid indicator comprising a source of direct current electrical energy, a flashing warning lamp, a controlled rectifier having an anode, a cathode and a gate, a warning lamp circuit means connecting said warning lamp in circuit with said source of direct current electrical energy and said anode and said cathode of said controlled rectifier, a container filler with liquid, a probe positioned in said container is out of contact with said probe, and said gate for applying sufficient voltage on said gate to cause conduction of said controlled rectifier and the energization of said flashing warning lamp only when the liquid in said container is out of contact with said probe, said means comprising a vehicle driven alternator having a plurality of output windings, said probe coupled across one of said output windings, a capacitor connected in series with and between said probe and said one of said output windings and a capacitor connected between said probe and said gate whereby said gate is isolated from any direct current electrical energy component, said circuit means including means for periodically interrupting the circuit connecting said source of direct current electrical energy to said anode and cathode of said controlled rectifier and said warning lamp whereby said controlled rectifier is periodically switched to its nonconducting state, said last mentioned means comprising a bimetal switch connected in series with the source of electrical energy and the anode and cathode of said controlled rectifier, said bimetal switch being positioned in heat transfer relationship to said warning lamp.

6. A low level liquid indicator for use in an automotive vehicle comprising a direct current electrical storage battery, a controlled rectifier having an anode, a cathode and a gate, a flashing warning lamp, a warning lamp circuit means connecting said direct current eletcrical storage battery in series with the cathode and anode of said controlled rectifier and in circuit with said flashing warning lamp, said circuit means including means for periodically interrupting the circuit connecting said direct current electrical storage battery, said anode and cathode of said controlled rectifier and said flashing warning lamp whereby said controlled rectifier is periodically switched to its nonconducting state, an alternator including output windings and a rotor driven by the internal combustion engine, rectifier means coupled to said output windings and said electrical storage battery for rectifying the alternating output from said output windings, a container filled with liquid, a probe positioned in said container, and means including a first capacitor coupled to the output windings of said alternator and to said probe for applying an alternating electrical potential between said probe and said container, and means including a second capacitor coupled to said probe and said gate for applying a voltage from said output windings to said gate sufficient to switch said controlled rectifier to a conducting state when the liquid in said container is at a level where said probe is immersed in said liquid and insufficient to switch said controlled rectifier to a conducting state when the liquid in said container is at a level where said probe is not immersed in said liquid, said first and said second capacitors preventing any component of direct current electrical energy from being applied between said container and said probe.

7. The combination of claim 6 which includes a starter motor for starting the internal combustion engine in the automotive vehicle, and switch means coupling said source of direct current electrical energy to said starter motor and to said gate during starting operations for temporarily switching said controlled rectifier to a conducting state and energizing said flashing warning lamp during starting operations.

References Cited
UNITED STATES PATENTS

| | | |
|---|---|---|
| 2,845,614 | 7/1956 | Bell. |
| 3,291,149 | 12/1966 | Atkins _____ 340—244 |
| 3,312,936 | 4/1967 | Huntzinger. |
| 3,343,124 | 9/1967 | Tyzack. |

DONALD J. YUSKO, Primary Examiner

H. S. COHEN, Assistant Examiner

U.S. Cl. X.R.

137—392; 340—244